US010765911B1

(12) United States Patent
Hamoy

(10) Patent No.: US 10,765,911 B1
(45) Date of Patent: Sep. 8, 2020

(54) CORE EXERCISE ASSEMBLY

(71) Applicant: Dustin Hamoy, Waverly, MD (US)

(72) Inventor: Dustin Hamoy, Waverly, MD (US)

( * ) Notice: Subject to any disclaimer, the term of this patent is extended or adjusted under 35 U.S.C. 154(b) by 39 days.

(21) Appl. No.: 16/289,773

(22) Filed: Mar. 1, 2019

(51) Int. Cl.
*A63B 23/02* (2006.01)
*A61H 3/00* (2006.01)
*B25J 9/00* (2006.01)

(52) U.S. Cl.
CPC .......... *A63B 23/0205* (2013.01); *A61H 3/008* (2013.01); *B25J 9/0006* (2013.01)

(58) Field of Classification Search
CPC .... A61H 3/008; A63B 23/0205; A63B 7/085; A63B 2009/004; A63B 17/00–04; A63B 21/02–025; A63B 21/04–0442; A63B 21/055–0557; A63B 21/15–151; A63B 21/16; A63B 22/14–16; A63B 23/02–0238; A63B 37/00; A63B 39/00–2039/006; A63B 41/00; B25J 9/0006
See application file for complete search history.

(56) References Cited

U.S. PATENT DOCUMENTS

| | | | | |
|---|---|---|---|---|
| 5,833,587 A | * | 11/1998 | Strong | A63B 21/154 482/123 |
| 6,554,747 B1 | * | 4/2003 | Rempe | A63B 21/04 482/38 |
| 6,730,005 B1 | * | 5/2004 | Liao | A47C 3/16 446/220 |
| 8,353,434 B2 | | 1/2013 | Clayton, III | |
| 8,849,457 B2 | | 9/2014 | Jacobsen | |
| 8,968,222 B2 | | 3/2015 | Kazerooni | |
| 9,333,644 B2 | | 5/2016 | Angold | |
| D781,430 S | | 3/2017 | Konishi | |
| 9,808,073 B1 | | 11/2017 | Maxwell | |
| 2003/0036467 A1 | * | 2/2003 | Almada | A63B 41/00 482/140 |
| 2004/0002407 A1 | * | 1/2004 | Hawkes | A61H 3/008 482/69 |
| 2004/0256532 A1 | * | 12/2004 | Liao | A63B 22/18 248/346.01 |
| 2010/0130336 A1 | * | 5/2010 | McSorley | A63B 23/0355 482/110 |
| 2011/0183827 A1 | * | 7/2011 | Radi | A63B 21/0552 482/140 |

(Continued)

FOREIGN PATENT DOCUMENTS

WO WO2010101595 9/2010

*Primary Examiner* — Jennifer Robertson
*Assistant Examiner* — Catrina A Letterman

(57) ABSTRACT

A core exercise assembly includes a rack, a ball positioned in the rack, a cup that is positionable on top of the ball and a pair of knee pads that is each coupled to the top surface of the cup. Each of the user's knees can be positioned in a respective one of the knee pads for kneeling on the ball. A collar is closable around the ball having the collar being aligned with an equator of the ball. A plurality of bottom cords is each coupled between the collar and the rack. Each of the bottom cords is comprised of a resiliently stretchable material for strengthening core muscles. A shirt is wearable by the user and a plurality of top cords is each coupled between the shirt and the rack. Each of the top cords is comprised of a resiliently compressible material for exercising core muscles.

13 Claims, 7 Drawing Sheets

(56) References Cited

U.S. PATENT DOCUMENTS

| | | | |
|---|---|---|---|
| 2014/0210249 A1* | 7/2014 | Barnett | A47C 9/002 |
| | | | 297/452.41 |
| 2016/0339583 A1 | 11/2016 | Van Engelhoven et al. | |
| 2017/0021220 A1* | 1/2017 | Pagano | A63B 21/0557 |
| 2019/0183715 A1* | 6/2019 | Kapure | A61H 1/0262 |

* cited by examiner

CORE EXERCISE ASSEMBLY

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to exercise devices and more particularly pertains to a new exercise device for strengthening core muscles.

BRIEF SUMMARY OF THE INVENTION

An embodiment of the disclosure meets the needs presented above by generally comprising a rack, a ball positioned in the rack, a cup that is positionable on top of the ball and a pair of knee pads that is each coupled to the top surface of the cup. Each of the user's knees can be positioned in a respective one of the knee pads for kneeling on the ball. A collar is closable around the ball having the collar being aligned with an equator of the ball. A plurality of bottom cords is each coupled between the collar and the rack. Each of the bottom cords is comprised of a resiliently stretchable material for strengthening core muscles. A shirt is wearable by the user and a plurality of top cords is each coupled between the shirt and the rack. Each of the top cords is comprised of a resiliently compressible material for exercising core muscles.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
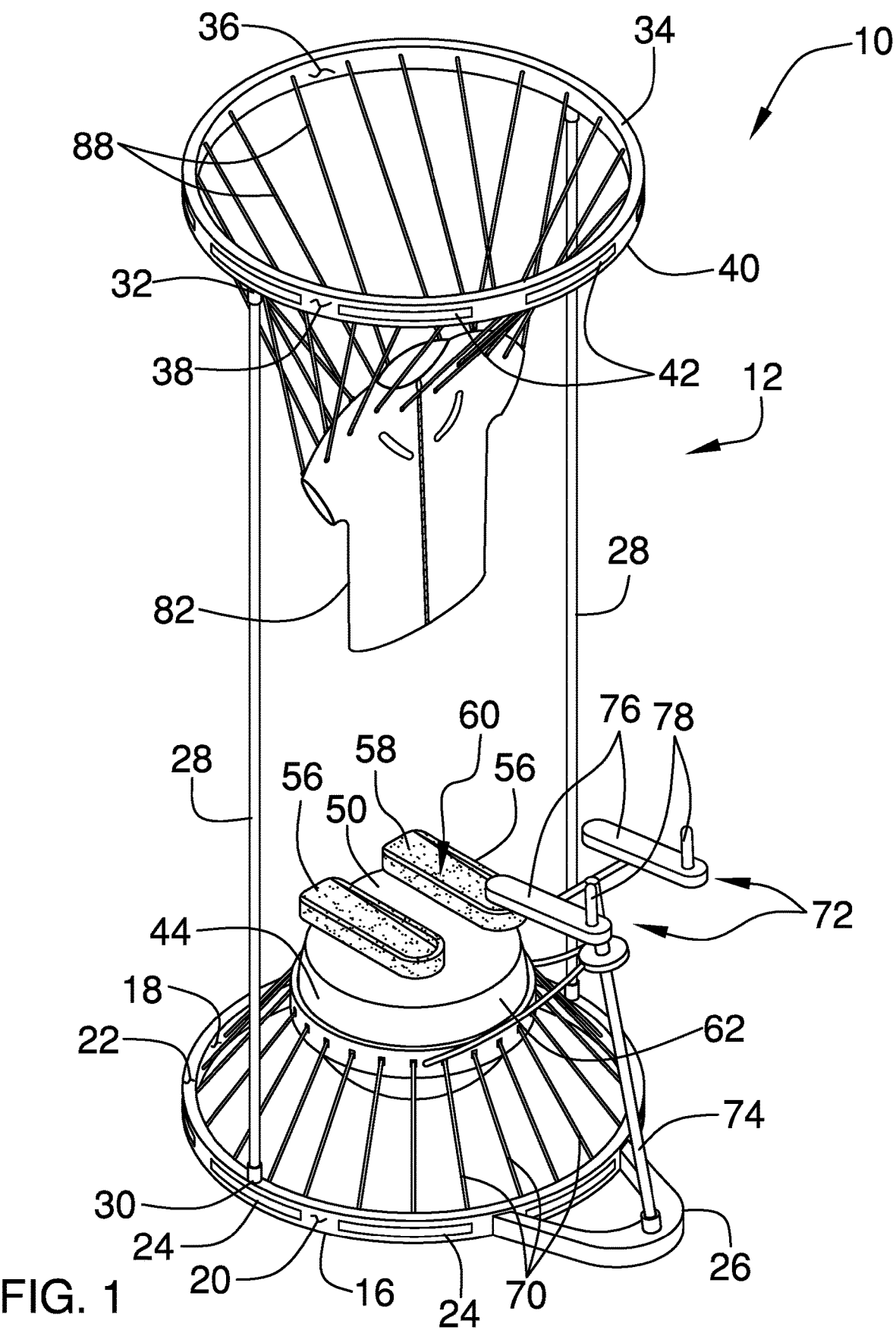
FIG. 1 is a top perspective view of a core exercise assembly according to an embodiment of the disclosure.
Figure 2:
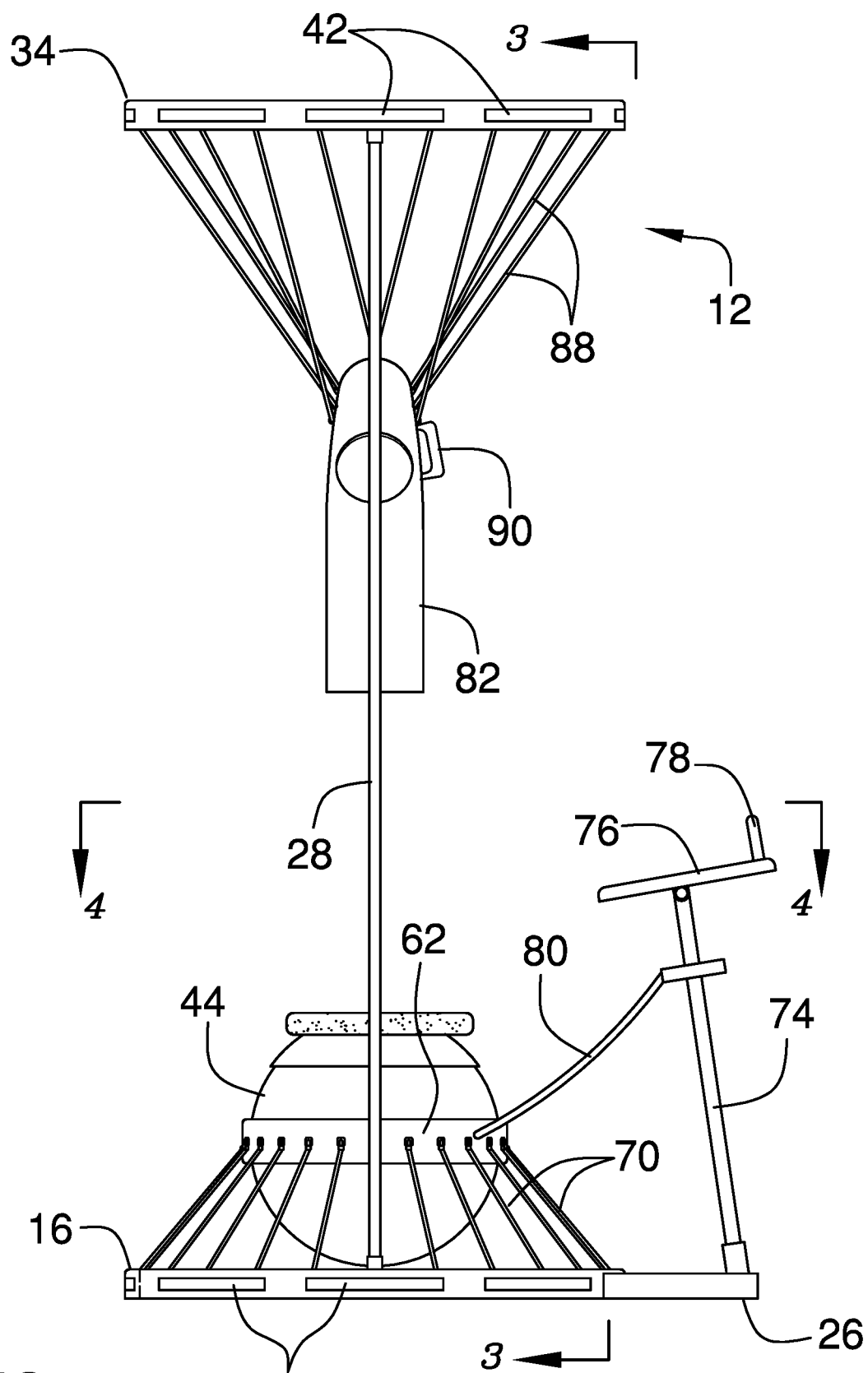
FIG. 2 is a right side view of an embodiment of the disclosure.
Figure 3:
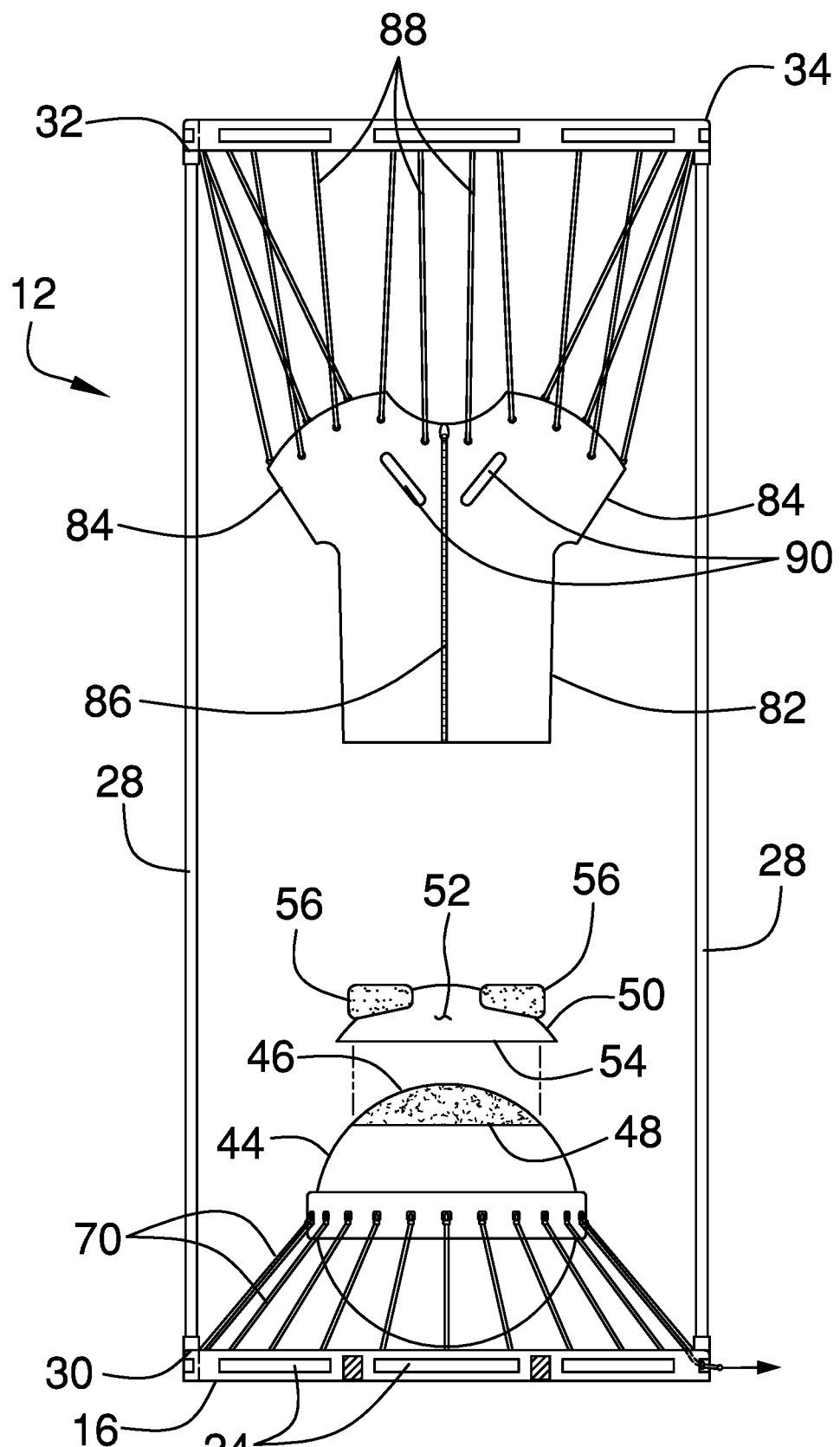
FIG. 3 is a cross sectional view taken along line 3-3 of FIG. 2 of an embodiment of the disclosure.
Figure 4:
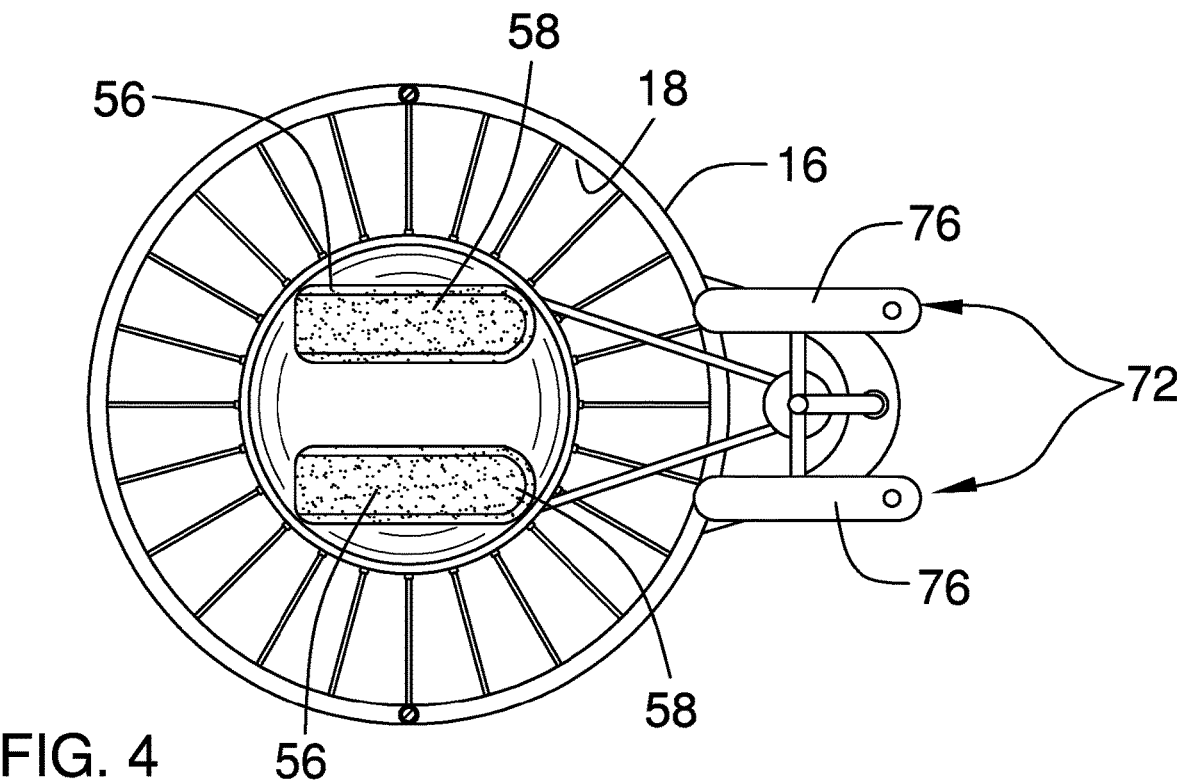
FIG. 4 is a cross sectional view taken along line 4-4 of FIG. 2 of an embodiment of the disclosure.
Figure 5:
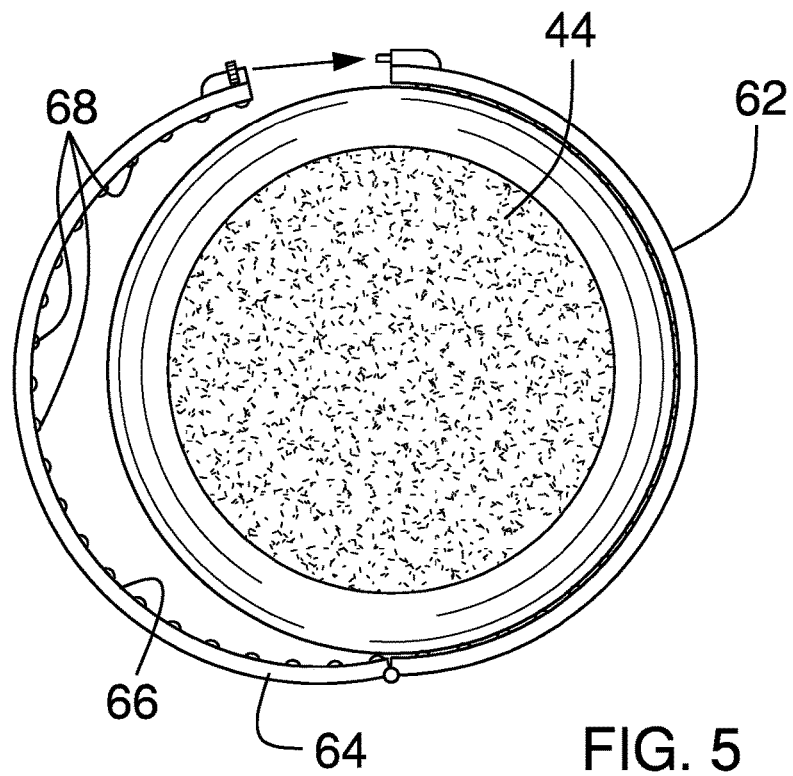
FIG. 5 is a bottom view of a ball and a collar an embodiment of the disclosure.
Figure 6:
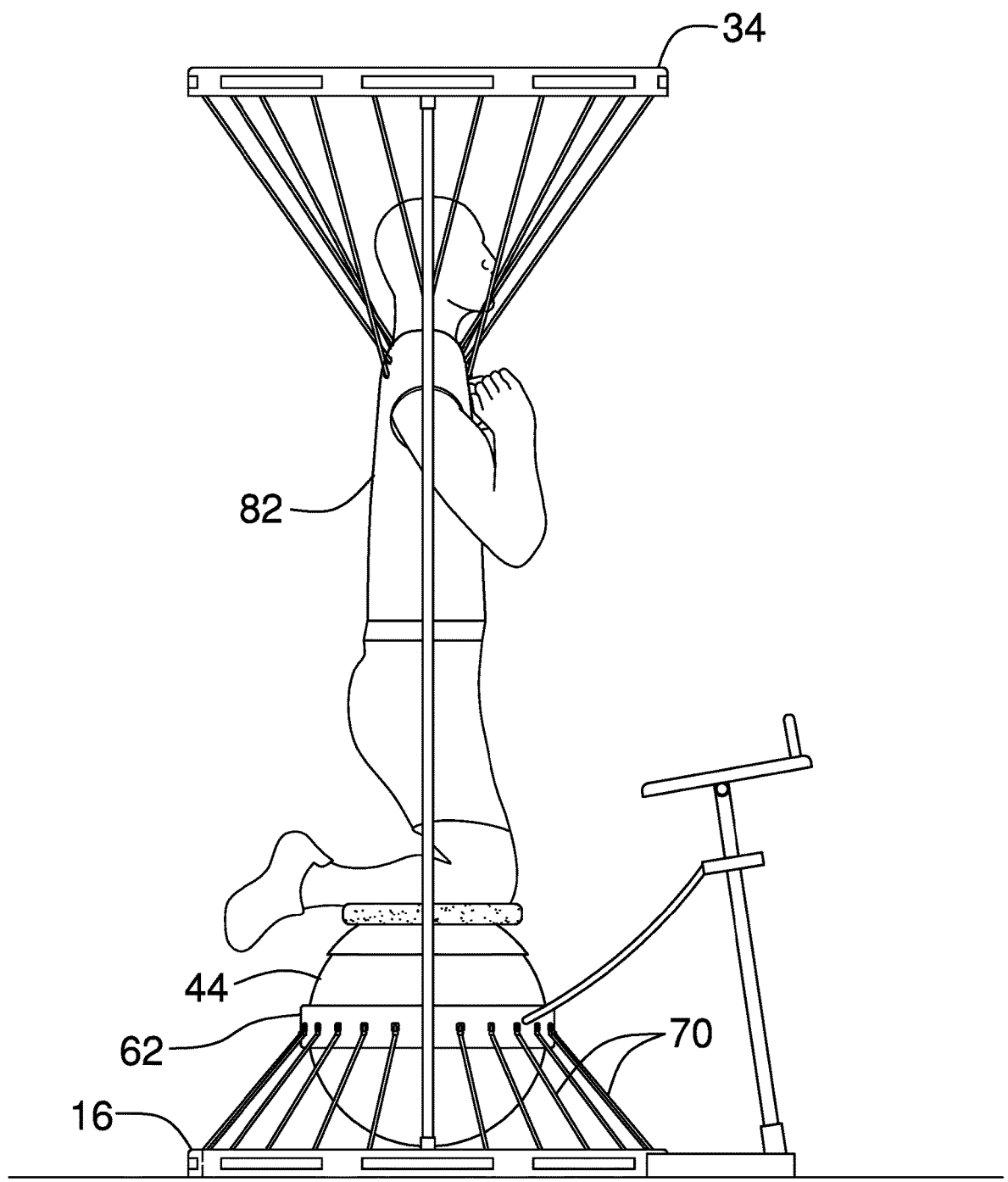
FIG. 6 is a perspective in-use view of an embodiment of the disclosure.

With reference now to the drawings, and in particular to FIGS. 1 through 8 thereof, a new exercise device embodying the principles and concepts of an embodiment of the disclosure and generally designated by the reference numeral 10 will be described.

As best illustrated in FIGS. 1 through 8, the core exercise assembly 10 generally comprises a rack 12 that is vertically oriented on a support surface 14. In this way a user can stand within the rack 12. The rack 12 comprises a bottom ring 16 that has an inwardly facing surface 18, an outwardly facing surface 20 and a top surface 22. The bottom ring 16 is positioned to lay on the support surface 14. The outwardly facing surface 20 has a plurality of wells 24 extending toward the inwardly facing surface 18, and the wells 24 are spaced apart from each other and are distributed around the bottom ring 16.

The rack 12 includes a support 26 that is coupled to and extends laterally away from the outwardly facing surface 20 of the bottom ring 16. A pair of poles 28 is provided and each of the poles 28 has a bottom end 30 and a top end 32. The bottom end 30 of each of the poles 28 is coupled to the top surface 22 of the bottom ring 16 having each of the poles 28 being vertically oriented. Additionally, the poles 28 are positioned on opposite sides of the bottom ring 16 with respect to each other.

The rack 12 includes a top ring 34 that has an inwardly facing surface 36, an outwardly facing surface 38 and a bottom surface 40. The bottom surface 40 has the top end 32 of each of the poles 28 being coupled thereto such that the top ring 34 is spaced from the bottom ring 16. The outwardly facing surface 38 of the top ring 34 has a plurality of wells 42 extending inwardly toward the inwardly facing surface 36 of the top ring 34. Additionally, the wells 42 on the top ring 34 are spaced apart from each other and are distributed around the top ring 34.

A ball 44 is positioned in the rack 12 having the ball 44 resting on the support surface 14. Additionally, the user can mount the ball 44. The ball 44 is comprised of a resiliently compressible material to enhance comfort for the user. The ball 44 may alternatively be an inflated ball or other compressible type of ball. The ball 44 has an upper end 46 and a mating member 48, such as a hook and loop fastener or the like, is coupled to the upper end 46 of the ball 44.

A cup 50 is positionable on top of the ball 44, and the cup 50 has a top surface 52 and a bottom surface 54. The bottom surface 54 of the cup 50 is concavely arcuate to conform to curvature of the ball 44 and the bottom surface 54 of the cup 50 releasably engages the mating member 48 on the upper end 46 of the ball 44. A pair of knee pads 56 is each coupled to the top surface 52 of the cup 50 for having a respective one of the user's knees positioned thereon to kneel on the ball 44. Each of the knee pads 56 has a top side 58 and the top side 58 of each of the knee pads 56 has a recess 60 for inhibiting the user's knees from sliding off of the knee pads 56.

A collar 62 is provided and the collar 62 is closable around the ball 44 having the collar 62 being aligned with an equator of the ball 44. The collar 62 has an outwardly facing surface 64 and an inwardly facing surface 66, and the inwardly facing surface 66 of the collar 62 has a plurality of bumps 68 thereon. The bumps 68 are spaced apart from each other and are distributed around an entire circumference of the collar 62. Additionally, each of the bumps 68 frictionally engages the ball 44 when the collar 62 is closed around the ball 44. The collar 62 may include a closure, such as is most clearly shown in FIG. 5, or other mechanism for opening and closing the collar 62.

A plurality of bottom cords 70 is provided and each of the bottom cords 70 is coupled between the collar 62 and the bottom ring 16 thereby centering the collar 62 within the bottom ring 16. Each of the bottom cords 70 is comprised of a resiliently stretchable material to pose resistance to the user moving the ball 44 within the rack 12. In this way the user can exercise and strengthen core muscles. Each of the bottom cords 70 is spaced apart from each other and is distributed around the outwardly facing surface 64 of the collar 62 and each of the bottom cords 70 engages the inwardly facing surface 18 of the bottom ring 16. Moreover, each of the bottom cords 70 is accessible through a respective one of the wells 24 in the bottom ring 16 for tightening or, as is most clearly shown in FIG. 7, for uncoupling the bottom cords 70 from the bottom ring 16.

A pair of arm rests 72 is provided and each of the arm rests 72 is coupled to and extends upwardly from the support 26 on the bottom ring 16. Each of the arm rests 72 has a respective one of the user's arms laid thereon when the user mounts the ball 44. The arm rests 72 include a support rod 74 extending upwardly from the support and a pair of panels 76 each coupled to and being spaced laterally away from the support rod 74. The panels 76 are spaced from the support rod 74 for having the respective arm laid thereon. Each of the arm rests 72 includes a pair of pegs 78 that each extends upwardly from a respective one of the panels 76 for being gripped by the user. A pair of members 80 each extends between the support rod 74 of the arm rests 72 and the outwardly facing surface 64 of the collar 62.

A shirt 82 is provided that is wearable by the user, and the shirt 82 has a pair of sleeves 84 and a zipper 86. A plurality of top cords 88 is each coupled between the top ring 34 and the shirt 82 such that the shirt 82 is suspended from the top ring 34. Each of the top cords 88 is comprised of a resiliently compressible material to pose resistance to the user moving the user's trunk and torso when the user wears the shirt 82. In this way the user can exercise and strengthen core muscles. Additionally, each of the top cords 88 is accessing through a respective one of the wells 42 in the top ring 34 for tightening or, as is most clearly shown in FIG. 8, for uncoupling the top cords 88 from the top ring 34.

A pair of handles 90 are coupled to the shirt 82 is coupled to the shirt 82. Each of the handles 90 is gripped by the user when the user wears the shirt 82. In this way the user can stabilize themselves when the user is pulling against the top cords 88. Each of the handles 90 is positioned on a front side of the shirt 82 and each of the handles 90 is positioned on opposite sides of the zipper 86.

Figure 7:
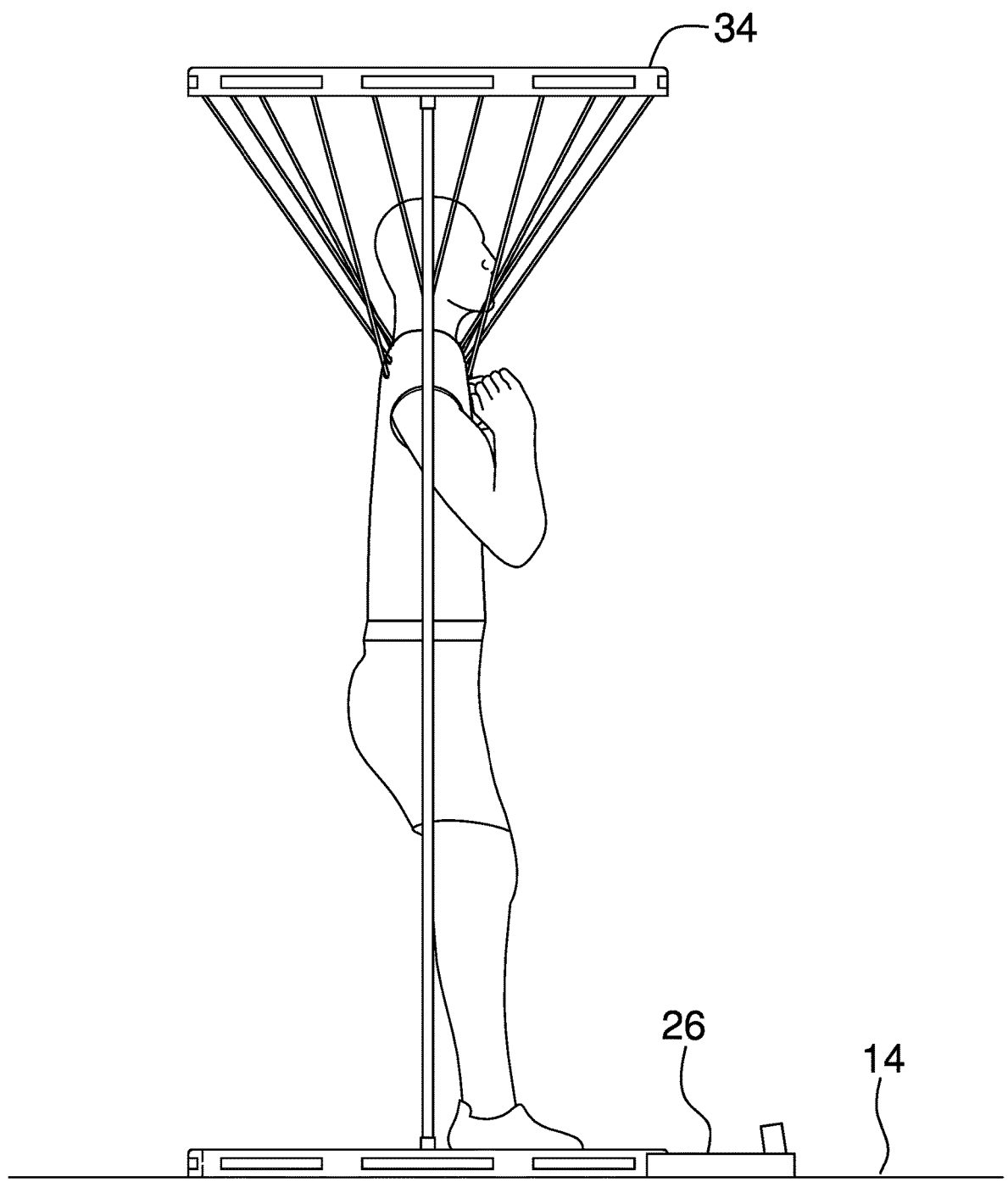
FIG. 7 is a perspective in-use view of an embodiment of the disclosure showing only a shirt and top cords being employed.
Figure 8:
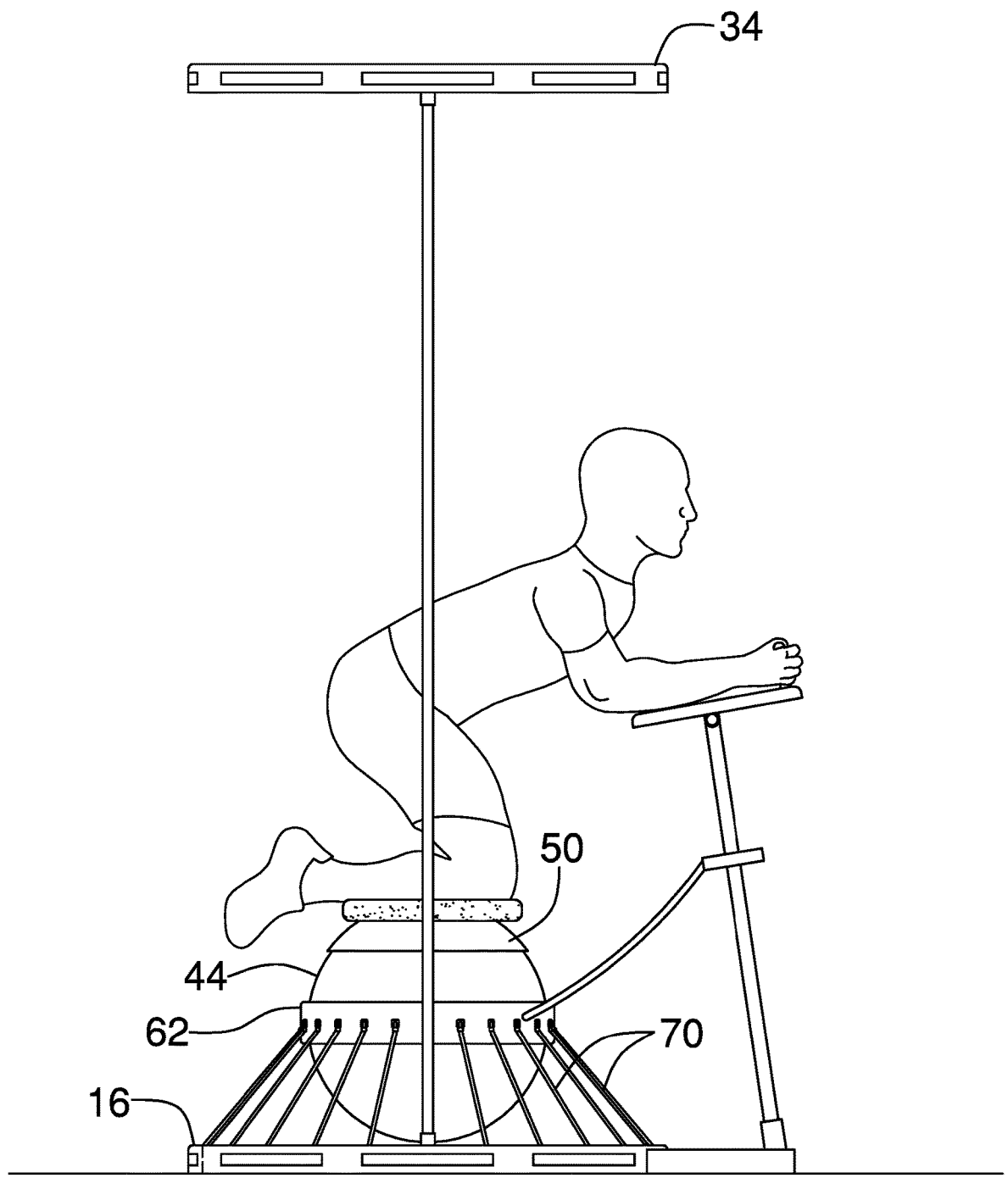
FIG. 8 is a perspective in-use view of an embodiment of the disclosure showing only a ball and bottom cords.

In use, the user kneels on each of the knee pads 56 and the user places each of the user's arms in the arm rests 72. The user subsequently employs the user's core muscles to urge the ball 44 back and forth against the resistance of the bottom cords 70. Additionally, the user wears the shirt 82 and the user grips the handles 90 on the shirt 82. Thus, the user subsequently employs the user's core muscles to bend, twist and otherwise move against the resistance of the top cords 88. As shown in FIG. 8, the shirt 82 and top cords 88 can be removed from the rack 12 and the ball 44 and arm rests 72 can be employed alone. As shown in FIG. 7, the ball 44, collar 62, bottom cords 70 and arm rests 72 can be removed and the shirt 82 can be employed alone.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A core exercise assembly being configured to be mounted by a user for exercising core muscles, said assembly comprising:

a rack being vertically oriented on a support surface wherein said rack is configured to have a user stand within said rack;

a ball being positioned in said rack having said ball resting on the support surface wherein said ball is configured to have the user mounted thereon, said ball being comprised of a resiliently compressible material wherein said ball is configured to enhance comfort for the user;

a cup being positionable on top of said ball;

a pair of knee pads, each of said knee pads being coupled to a top surface of said cup wherein each of said knee pads is configured have a respective one of the user's knees positioned thereon for kneeling on said ball;

a collar being closable around said ball having said collar being aligned with an equator of said ball;

a plurality of bottom cords, each of said bottom cords being coupled between said collar and a bottom ring thereby centering said collar within said bottom ring, each of said bottom cords being comprised of a resiliently stretchable material wherein said bottom cords are configured to pose resistance to the user moving said ball within said rack for strengthening core muscles;

a pair of arm rests, each of said arm rests being coupled to and extending upwardly from a support on said bottom ring wherein each of said arm rests is configured to a respective one of the user's arms laid thereon when the user mounts said ball;

a shirt being wearable by the user, said shirt having a pair of sleeves and a zipper; and a plurality of top cords, each of said top cords being coupled between a top ring and said shirt such that said shirt is suspended from said top ring, each of said top cords being comprised of a resiliently compressible material wherein each of said top cords is configured to pose resistance to the user moving the user's trunk and torso when the user wears said shirt for exercising core muscles.

2. The assembly according to claim 1, wherein said rack comprises:

said bottom ring having an inwardly facing surface, an outwardly facing surface and a top surface, said bottom ring being positioned to lie on the support surface;

said support being coupled to and extending laterally away from said outwardly facing surface of said bottom ring;

a pair of poles, each of said poles having a bottom end and a top end, said bottom end of each of said poles being coupled to said top surface of said bottom ring having each of said poles being vertically oriented, said poles being positioned on opposite sides of said bottom ring with respect to each other; and said top ring having an inwardly facing surface, an outwardly facing surface and a bottom surface, said bottom surface of said top ring having said top end of each of said poles being coupled thereto such that said top ring is spaced from said bottom ring.

3. The assembly according to claim 2, wherein:

said ball has an upper end;

said assembly further comprises a mating member being coupled to said upper end of said ball; and said cup has a top surface and a bottom surface, said bottom surface of said cup being concavely arcuate, said bottom surface of said cup releasably engaging said mating member on said upper end of said ball.

4. The assembly according to claim 3, wherein said collar has an outwardly facing surface and an inwardly facing surface, said inwardly facing surface of said collar having a plurality of bumps thereon, said bumps being spaced apart from each other and being distributed around an entire circumference of said collar, each of said bumps frictionally engaging said ball when said collar is closed around said ball.

5. The assembly according to claim 4, wherein:

each of said bottom cords is spaced apart from each other and is distributed around said outwardly facing surface of said collar, each of said bottom cords engaging said inwardly facing surface of said bottom ring; and each of said top cords is spaced apart from each other and is distributed around said inwardly facing surface of said top ring.

6. The assembly according to claim 2, wherein said arm rests include a support rod extending upwardly from said support and a pair of panels each being coupled to and being spaced laterally away from said support rod having said panels being spaced from said support wherein each of said panels is configured to have the respective arm laid thereon, each of said arm rests including a pair of pegs each extending upwardly from a respective one of said panels wherein each of said pegs is configured to be gripped by the user.

7. The assembly according to claim 1, further comprising a pair handles, each of said handles being coupled to said shirt wherein each of said handles is configured to be gripped by the user when the user wears said shirt, each of said handles being positioned on a front side of said shirt, each of said handles being positioned on opposite sides of said zipper.

8. A core exercise assembly being configured to be mounted by a user for exercising core muscles, said assembly comprising:

a rack being vertically oriented on a support surface wherein said rack is configured to have a user stand within said rack, said rack comprising:

a bottom ring having an inwardly facing surface, an outwardly facing surface and a top surface, said bottom ring being positioned to lie on the support surface;

a support being coupled to and extending laterally away from said outwardly facing surface of said bottom ring;

a pair of poles, each of said poles having a bottom end and a top end, said bottom end of each of said poles being coupled to said top surface of said bottom ring having each of said poles being vertically oriented, said poles being positioned on opposite sides of said bottom ring with respect to each other; and a top ring having an inwardly facing surface, an outwardly facing surface and a bottom surface, said bottom surface of said top ring having said top end of each of said poles being coupled thereto such that said top ring is spaced from said bottom ring;

a ball being positioned in said rack having said ball resting on the support surface wherein said ball is configured to have the user mounted thereon, said ball being comprised of a resiliently compressible material wherein said ball is configured to enhance comfort for the user, said ball having an upper end;

a mating member being coupled to said upper end of said ball;

a cup being positionable on top of said ball, said cup having a top surface and a bottom surface, said bottom surface of said cup being concavely arcuate, said bottom surface of said cup releasably engaging said mating member on said upper end of said ball;

a pair of knee pads, each of said knee pads being coupled to said top surface of said cup wherein each of said knee pads is configured have a respective one of the user's knees positioned thereon for kneeling on said ball, each of said knee pads having a top side, said top side of each of said knee pads having a recess for inhibiting the user's knees from sliding off of said knee pads;

a collar being closable around said ball having said collar being aligned with an equator of said ball, said collar having an outwardly facing surface and an inwardly facing surface, said inwardly facing surface of said collar having a plurality of bumps thereon, said bumps being spaced apart from each other and being distributed around an entire circumference of said collar, each of said bumps frictionally engaging said ball when said collar is closed around said ball;

a plurality of bottom cords, each of said bottom cords being coupled between said collar and said bottom ring thereby centering said collar within said bottom ring, each of said bottom cords being comprised of a resiliently stretchable material wherein said bottom cords are configured to pose resistance to the user moving said ball within said rack for strengthening core muscles, each of said bottom cords being spaced apart from each other and being distributed around said outwardly facing surface of said collar, each of said bottom cords engaging said inwardly facing surface of said bottom ring;

a pair of arm rests, each of said arm rests being coupled to and extending upwardly from said support on said bottom ring wherein each of said arm rests is configured to a respective one of the user's arms laid thereon when the user mounts said ball, said arm rests including a support rod extending upwardly from said support and a pair of panels each being coupled to and being spaced laterally away from said support rod having said panels being spaced from said support wherein each of said panels is configured to have the respective arm laid thereon, each of said arm rests including a pair of pegs each extending upwardly from a respective one of said panels wherein each of said pegs is configured to be gripped by the user;

a pair of members, each of said members extending between said support rod of said arm rests and said outwardly facing surface of said collar a shirt being wearable by the user, said shirt having a pair of sleeves and a zipper;

a plurality of top cords, each of said top cords being coupled between said top ring and said shirt such that said shirt is suspended from said top ring, each of said top cords being comprised of a resiliently compressible material wherein each of said top cords is configured to pose resistance to the user moving the user's trunk and torso when the user wears said shirt for exercising core muscles; and a pair handles, each of said handles being coupled to said shirt wherein each of said handles is configured to be gripped by the user when the user wears said shirt, each of said handles being positioned on a front side of said shirt, each of said handles being positioned on opposite sides of said zipper.

9. The assembly according to claim 8, wherein said outwardly facing surface of said bottom ring has a plurality of wells extending toward said inwardly facing surface of said bottom ring, said wells being spaced apart from each other and being distributed around said bottom ring.

10. The assembly according to claim 9, wherein each of said bottom cords is accessible through a respective one of said wells in said bottom ring for tightening or for uncoupling said bottom cords from said bottom ring.

11. The assembly according to claim 8, wherein said outwardly facing surface of said top ring has a plurality of wells extending inwardly toward said inwardly facing surface of said top ring, said wells on said top ring being spaced apart from each other and being distributed around said top ring.

12. The assembly according to claim 11, wherein each of said top cords is accessible through a respective one of said wells in said top ring for tightening or for uncoupling said top cords from said top ring.

13. A core exercise assembly being configured to be mounted by a user for exercising core muscles, said assembly comprising:

a rack being vertically oriented on a support surface wherein said rack is configured to have a user stand within said rack, said rack comprising:

a bottom ring having an inwardly facing surface, an outwardly facing surface and a top surface, said bottom ring being positioned to lie on the support surface, said outwardly facing surface of said bottom ring having a plurality of wells extending toward said inwardly facing surface of said bottom ring, said wells being spaced apart from each other and being distributed around said bottom ring;

a support being coupled to and extending laterally away from said outwardly facing surface of said bottom ring;

a pair of poles, each of said poles having a bottom end and a top end, said bottom end of each of said poles being coupled to said top surface of said bottom ring having each of said poles being vertically oriented, said poles being positioned on opposite sides of said bottom ring with respect to each other; and a top ring having an inwardly facing surface, an outwardly facing surface and a bottom surface, said bottom surface of said top ring having said top end of each of said poles being coupled thereto such that said top ring is spaced from said bottom ring, said outwardly facing surface of said top ring having a plurality of wells extending inwardly toward said inwardly facing surface of said top ring, said wells on said top ring being spaced apart from each other and being distributed around said top ring;

a ball being positioned in said rack having said ball resting on the support surface wherein said ball is configured to have the user mounted thereon, said ball being comprised of a resiliently compressible material wherein said ball is configured to enhance comfort for the user, said ball having an upper end;

a mating member being coupled to said upper end of said ball;

a cup being positionable on top of said ball, said cup having a top surface and a bottom surface, said bottom surface of said cup being concavely arcuate, said bottom surface of said cup releasably engaging said mating member on said upper end of said ball;

a pair of knee pads, each of said knee pads being coupled to said top surface of said cup wherein each of said knee pads is configured have a respective one of the user's knees positioned thereon for kneeling on said ball, each of said knee pads having a top side, said top side of each of said knee pads having a recess for inhibiting the user's knees from sliding off of said knee pads;

a collar being closable around said ball having said collar being aligned with an equator of said ball, said collar having an outwardly facing surface and an inwardly facing surface, said inwardly facing surface of said collar having a plurality of bumps thereon, said bumps being spaced apart from each other and being distributed around an entire circumference of said collar, each of said bumps frictionally engaging said ball when said collar is closed around said ball;

a plurality of bottom cords, each of said bottom cords being coupled between said collar and said bottom ring thereby centering said collar within said bottom ring, each of said bottom cords being comprised of a resiliently stretchable material wherein said bottom cords are configured to pose resistance to the user moving said ball within said rack for strengthening core muscles, each of said bottom cords being spaced apart from each other and being distributed around said outwardly facing surface of said collar, each of said bottom cords engaging said inwardly facing surface of said bottom ring, each of said bottom cords being accessible through a respective one of said wells in said bottom ring for tightening or for uncoupling said bottom cords from said bottom ring;

a pair of arm rests, each of said arm rests being coupled to and extending upwardly from said support on said bottom ring wherein each of said arm rests is configured to a respective one of the user's arms laid thereon when the user mounts said ball, said arm rests including a support rod extending upwardly from said support and a pair of panels each being coupled to and being spaced laterally away from said support rod having said panels being spaced from said support wherein each of said panels is configured to have the respective arm laid thereon, each of said arm rests including a pair of pegs each extending upwardly from a respective one of said panels wherein each of said pegs is configured to be gripped by the user;

a pair of members, each of said members extending between said support rod of said arm rests and said outwardly facing surface of said collar a shirt being wearable by the user, said shirt having a pair of sleeves and a zipper;

a plurality of top cords, each of said top cords being coupled between said top ring and said shirt such that said shirt is suspended from said top ring, each of said top cords being comprised of a resiliently compressible material wherein each of said top cords is configured to pose resistance to the user moving the user's trunk and torso when the user wears said shirt for exercising core muscles, each of said top cords being accessible through a respective one of said wells in said top ring for tightening or for uncoupling said top cords from said top ring; and a pair handles, each of said handles being coupled to said shirt wherein each of said handles is configured to be gripped by the user when the user wears said shirt, each of said handles being positioned on a front side of said shirt, each of said handles being positioned on opposite sides of said zipper.

\* \* \* \* \*